US010638259B2

(12) United States Patent
Lairsey et al.

(10) Patent No.: US 10,638,259 B2
(45) Date of Patent: Apr. 28, 2020

(54) SYSTEMS AND METHOD FOR MAPPING SYSTEMS IN A SERVER RACK BASED ON NEIGHBORING SYSTEMS

(71) Applicant: DELL PRODUCTS, LP, Round Rock, TX (US)

(72) Inventors: Jeffrey M. Lairsey, Round Rock, TX (US); Sajjad Ahmed, Austin, TX (US); Arulnambi Raju, Austin, TX (US); Minhaz Islam, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 80 days.

(21) Appl. No.: 15/672,998

(22) Filed: Aug. 9, 2017

(65) Prior Publication Data

US 2019/0053002 A1 Feb. 14, 2019

(51) Int. Cl.
*H04W 4/02* (2018.01)
*H04B 17/318* (2015.01)
*H04B 17/27* (2015.01)

(52) U.S. Cl.
CPC ............ *H04W 4/023* (2013.01); *H04B 17/27* (2015.01); *H04B 17/318* (2015.01)

(58) Field of Classification Search
CPC ...... H04W 4/023; H04B 17/27; H04B 17/318
See application file for complete search history.

(56) References Cited

U.S. PATENT DOCUMENTS

| | | | |
|---|---|---|---|
| 7,886,060 B2 | 2/2011 | Rosenberg | |
| 8,626,548 B2 * | 1/2014 | Patel | G06Q 10/06 705/7.15 |
| 9,055,697 B2 * | 6/2015 | Lyon | H05K 7/20836 |
| 9,391,859 B2 | 7/2016 | Huang et al. | |
| 9,594,385 B2 * | 3/2017 | Mick | G05D 23/1917 |
| 9,602,976 B1 * | 3/2017 | Notohardjono | H04W 4/023 |
| 2003/0046339 A1 * | 3/2003 | Ip | H04L 41/12 709/203 |
| 2004/0008113 A1 * | 1/2004 | Pradhan | G01S 5/0289 340/539.26 |
| 2008/0114865 A1 * | 5/2008 | Rothman | H04L 12/66 709/223 |
| 2009/0282140 A1 * | 11/2009 | White | H04L 67/12 709/223 |
| 2010/0286843 A1 * | 11/2010 | Lyon | G05D 23/1932 700/300 |
| 2014/0292582 A1 * | 10/2014 | Ware | G01S 5/04 342/450 |

(Continued)

*Primary Examiner* — Khaled M Kassim (74) *Attorney, Agent, or Firm* — Larson Newman, LLP (57) ABSTRACT

A system includes a first processing device with a first wireless interface, a second processing device with a second wireless interface, and a third processing device with a third wireless interface. The first processing device establishes a first wireless link between the first and second wireless interfaces, determines a first received signal strength indication for the first wireless link, establishes a second wireless link between the first and third wireless interfaces, determines a second received signal strength indication for the second wireless link, receives a third received signal strength indication for a third wireless link between the second and third processing systems, and determines that the first, second, and third processing systems are in a first server rack based upon the first, second, and third received signal strength indications.

17 Claims, 4 Drawing Sheets

(56) References Cited

U.S. PATENT DOCUMENTS

| | | | |
|---|---|---|---|
| 2015/0098608 A1* | 4/2015 | Hintermeister | G06K 9/00 |
| | | | 382/103 |
| 2015/0338281 A1 | 11/2015 | Ross et al. | |
| 2015/0351847 A1* | 12/2015 | Couillaud | A61M 5/1413 |
| | | | 709/245 |
| 2015/0358834 A1 | 12/2015 | Cronin | |
| 2016/0380834 A1* | 12/2016 | Peng | H04L 41/12 |
| | | | 370/254 |
| 2017/0048313 A1* | 2/2017 | Luo | H04L 67/1097 |
| 2017/0094632 A1 | 3/2017 | Shetty et al. | |
| 2017/0142609 A1 | 5/2017 | Balasubramanian et al. | |
| 2017/0187574 A1* | 6/2017 | Subramanian | H04L 41/0806 |

\* cited by examiner

SYSTEMS AND METHOD FOR MAPPING SYSTEMS IN A SERVER RACK BASED ON NEIGHBORING SYSTEMS

FIELD OF THE DISCLOSURE

This disclosure generally relates to information handling systems, and more particularly relates to mapping systems in a server rack based upon neighboring systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A system may include a first processing device with a first wireless interface, a second processing device with a second wireless interface, and a third processing device with a third wireless interface. The first processing device may establish a first wireless link between the first and second wireless interfaces, determine a first received signal strength indication for the first wireless link, establish a second wireless link between the first and third wireless interfaces, determine a second received signal strength indication for the second wireless link, receive a third received signal strength indication for a third wireless link between the second and third processing systems, and determine that the first, second, and third processing systems are in a first server rack based upon the first, second, and third received signal strength indications.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
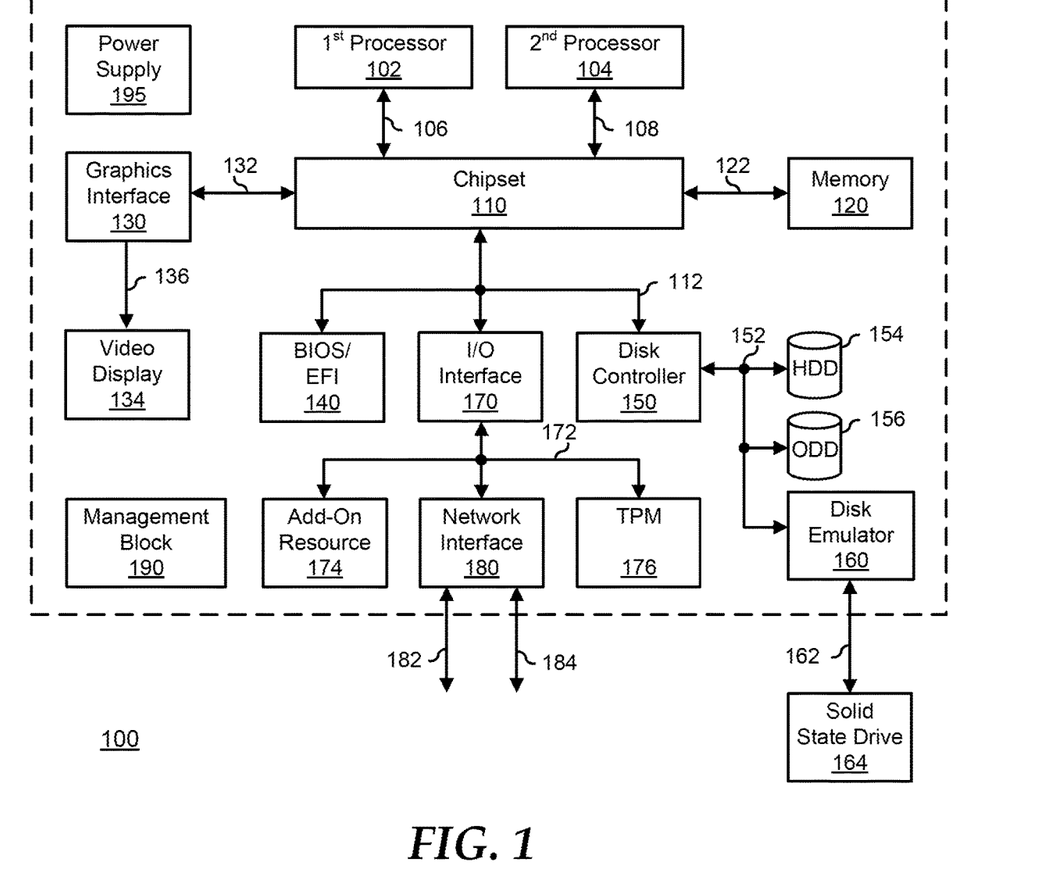
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
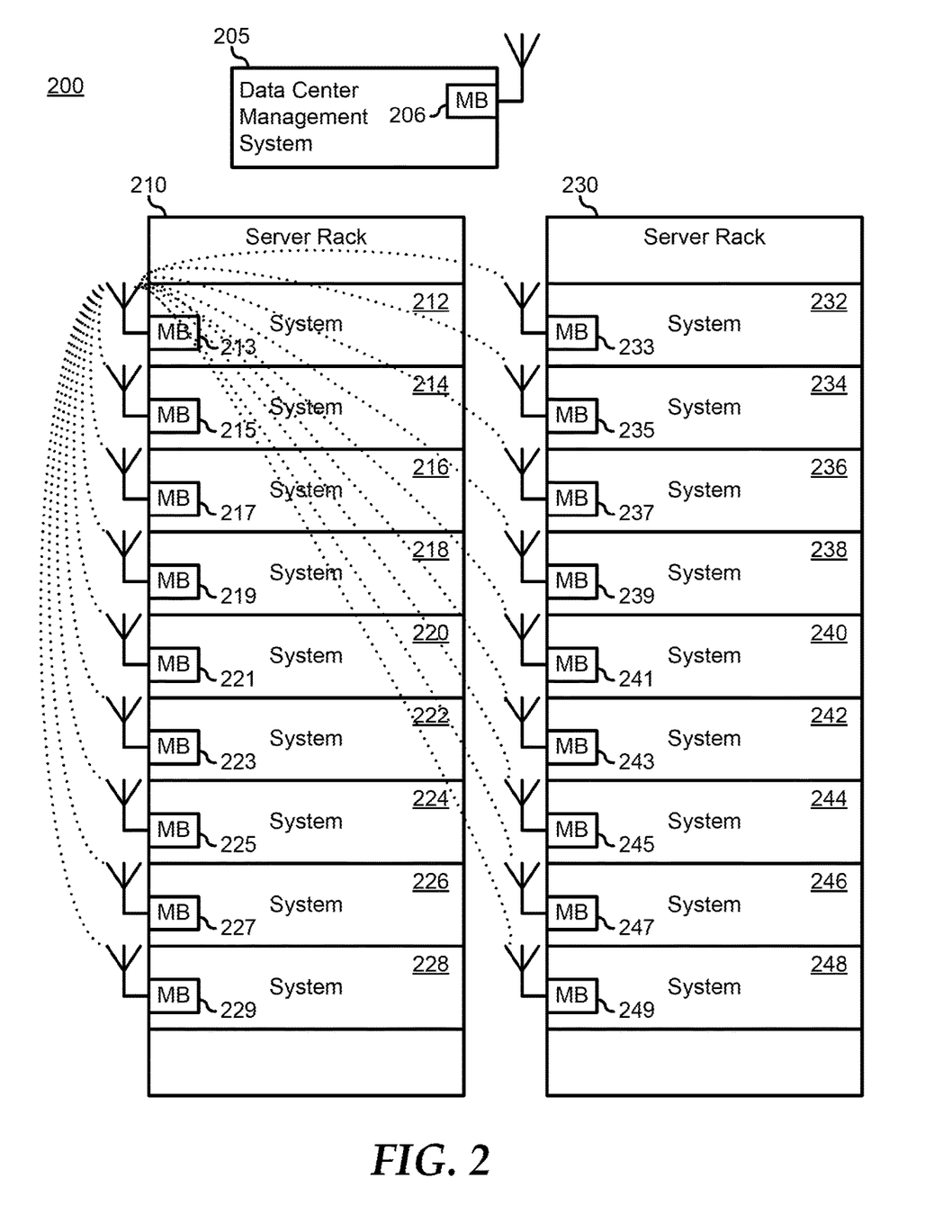
FIG. 2 illustrates server racks within a data center according to an embodiment of the present disclosure.

FIG. 2 illustrates a data center 200, including a data center management system 205 and adjacent server racks 205 and 230. Data center 200 represents a collocated group of networked information handling systems utilized by an organization to provide remote storage, processing, and distribution of large amounts of data. In a particular embodiment, the information handling systems (hereinafter, "processing systems") of data center 200 are networked together via a data backbone that provides high bandwidth communication paths between the processing systems to enable the storage, processing, and distribution of the data handled by the data center. The data backbone can be implemented as one or more network, communication, or storage fabrics, such as a Multi-Gigabit Ethernet, Fibre Channel or Fibre-Channel-Over-Ethernet (FCoE), Serial ATA, PCI-e, Serial Attached SCSI (SAS), or another stand-alone or hybrid fabric, as needed of desired.

In addition to the data backbone, the processing systems of data center 200 are networked together via a management network that provides for the OOB management of the respective processing systems of the data center, and each processing system includes one or more management block similar to management block 190. In a particular embodiment, the management network is provided in data center 200 as a network similar to the data backbone, but that is separate from the data backbone. In another embodiment, the management network is provided in data center 200 by the data backbone, but where the management network traffic is isolated from the data traffic of the host processing system of the processing systems of the data center. Here, the management traffic can be isolated by establishing a virtual private network (VPN) between the management blocks over the data backbone.

Additionally, whether the management network is provided by a separate network, or is provided as isolated network traffic on the data backbone, data center 200 is configured to provide the management network wirelessly. Here, the management blocks of each processing system of data center 200 includes a wireless communication interface that permits the processing systems of the data center to communicate with each other outside of the management network, and to permit a user of a mobile device to connect to the management block of the associated processing system to gain management access to the functions and features of the management block. As such, the wireless communication interface represents a wireless data communication interface for short-range wireless communications. For example, the wireless communication interface may include a wireless data communication interface for establishing a Personal Area Network (PAN), such as a Near-Field Communication (NFC) interface, a Bluetooth interface, a Bluetooth-Low Energy (Bluetooth-LE) interface, or the like, or for establishing a Wireless Local Area Network (WLAN), such as a WiFi or 802.11 interface or the like, or another wireless interface.

Data center management system 205 represents one or more information handling system that is connected to the management network, and provides a centralized user interface for directing and controlling the various management functions and features of the management system, such as the retrieval of information related to the operation of the processing systems of data center 200, the provision of BIOS/UEFI or system firmware updates, the management of non-processing components of processing systems of the data center, such as system cooling fans and power supplies, and the maintenance of a processing system map of the data center. Data center management system 205 includes a management block 206 with a wireless communication interface, as indicated by an antenna symbol connected to the management block. Here, management block 206 is similar to management block 190 less in terms of the management capabilities being utilized to manage data center management system 205 itself, but in terms of its ability to participate in the management network, and to maintain the processing system map, as described further, below.

Server racks 210 and 230 represent standardized frames for mounting the processing systems of data center 200. An example of server racks 220 and 230 includes standard frames for mounting processing systems in accordance with an Electronic Industries Alliance specification EIA-310-D, *Cabinets, Racks, Panels, and Associated Equipment*. As such, server racks 210 and 230 can be 24 inches wide, 40 inches deep, and can vary in height from 48-84 inches or more, and can accommodate the mounting of equipment that has a front panel that is 19 inches wide. Further, the equipment mounted in server racks 210 and 230 can be configured with front panel heights that are defined in terms of a rack unit (U) of 1.75 inches. That is, equipment that is 2 inches high is referred to as "1U" equipment, equipment that is 4 inches high is referred to as "2U" equipment, and so on. Further, server racks 210 and 220 can define locations within the server racks for mounting equipment in terms of rack units (U). For example, a lowermost mounting location in server racks 210 and 220 can be designated as "U1," a next lowermost mounting location in server racks 210 and 220 can be designated as "U2," and so on. Other examples of standardized frames can include a European Telecommunications Standards Institute (ETSI) standard ETS 300 119, a Western Electric standard 23 inch frame, an Open Rack mounting system in accordance with an Open Compute Project, or another standardized frame, as needed or desired. It will be understood that data center 200 may include one or more additional server racks similar to server racks 210 and 230 placed side-by-side in rows and that additional server racks may be provided that are arranged in a face-to-face configuration. Moreover, additional server racks may also be provided behind in a back-to-back configuration. A typical data center may have aisles between the server racks that are 50 inches wide. Other dimensions may be utilized as needed or desired, however, henceforth, server racks 210 and 230 will be assumed to be configured in accordance with the EIA-310-D standard, and will be assumed to be arranged in rows separated by 50 inch aisles.

One or more of server racks 210 and 230 may include a management block similar to management block 190 for providing a centralized node to provide management functions for the processing systems of the server racks, as needed or desired. For the purposes of this disclosure, references to communications with a server rack will be understood to include communications with the processing systems mounted within the server rack.

Server rack 210 includes processing systems 212, 214, 216, 218, 220, 222, 224, 226, and 228. Processing systems 212-228 each represent one of a wide variety of processing systems commonly utilized in a data center, such as a top-of-rack (ToR) switch, a blade server, a stand-alone server, a storage server, a power supply, or another processing system commonly utilized in a data center. Each of processing systems 212-228 include respective management block 213-229, each with a wireless communication interface. Similarly, server rack 230 includes processing systems 232, 234, 236, 238, 240, 242, 244, 246, and 248. Processing systems 232-248 each represent one of a wide variety of processing systems commonly utilized in a data center, such as a top-of-rack (ToR) switch, a blade server, a stand-alone server, a storage server, a power supply, or another processing system commonly utilized in a data center. Each of processing systems 232-248 include respective management block 233-249, each with a wireless communication interface. As illustrated, server racks 210 and 230 are configured with similar processing systems, but this is not necessarily so, and the skilled artisan will understand that server racks may include similar processing systems or different processing systems, as needed or desired, and that additional types of processing systems may be mounted in a server rack, as needed or desired. The wireless communication interfaces can be in accordance with one or more wireless communication standards for short range wireless communications, such as a wireless local-area network (WLAN), a personal area network (PAN), or another short range wireless networking interface, such as a 802.11 (WiFi) interface, a Bluetooth or Bluetooth-Low-Energy (Bluetooth-LE) interface, or another WLAN or PAN wireless communication standard, as needed or desired. The wireless communication interfaces can also be in accordance with one or more other standards for short range wireless communications, such as InfraRed communication, optical communication, or other wireless communication, as needed or desired.

Management blocks 213-229 and 233-249 are each configured to utilize their wireless communication interfaces to identify the other management blocks that are within range of their wireless communication interfaces. Then management blocks 213-229 and 233-249 categorize the other management blocks in terms of the received signal strength from the wireless communication interfaces of the other management blocks to estimate the locations of the other management blocks. In particular, management blocks 213-229 and 233-249 operate to determine possible mappings of the processing systems that are within a common server rack 210 or 230, and those that are within the other server rack. Management blocks 213-229 and 233-249 then aggregate their estimations to create a mapping of processing systems within each of server racks 210 and 230. If the aggregation of the estimations result in two or more possible mappings, then management blocks 213-229 and 233-249 operate to provide the possible mappings to data center management system 205, where a data center administrator selects the correct mapping for the processing systems within each of server racks 210 and 230, and the data center management system returns an indication of the correct mapping to the server racks. In this way, the mapping of processing systems within a server rack can be automatically done by the processing systems, without invoking human input except as may be needed to resolve possible conflicts. Further, when a new processing system is installed in a server rack, or an existing processing system is removed from the server rack, the remapping of the processing systems within the server rack can be automatically performed based upon the presence of the new system or the absence of the existing processing system's wireless communication interface signal.

TABLE 1

Typical RSSI Values

| Unit | RSSI Value |
|---|---|
| 0 U - Base Unit | −40 dBi |
| 1 U (2 inches) | −50 dBi |
| 2 U (4 inches) | −60 dBi |
| 5 U (10 inches) | −70 dBi |
| 10 U (20 inches) | −80 dBi |
| Neighbor Rack (same location) (24 inches) | −80 dBi |
| Facing Rack (same location) (50 inches) | −90 dBi |
| Back-To-Back Rack (same location) (140 inches) | Out Of Range |

In particular, each of management blocks 213-229 and 233-249 participate in a three-step process to derive the groupings and order of the processing systems in respective server racks 210 and 230. In describing the three-step process, management block 213 will be discussed as an exemplary case, but it should be understood that each of the other management blocks 215-229 and 233-249 perform similar functions and operations of the process. Further, it will be understood that antennas associated with each of management blocks 213-229 and 233-249 are located within their respective processing systems 212-228 and 232-248 in a common location, such as in a top-left corner, but this may not necessarily be so. However, given this assumption, it will further be assumed that the various received signal strength indications (RSSI) will be in accordance with Table 1, above, where a rack unit will be understood to be 2 inches. Note that in the following description, the steps are described with respect to management block 213 at the top of server rack 210, but this is not necessarily so, and the process can be performed by any other management block, as needed or desired. Moreover, two or more management blocks may be utilized in performing the process to cross check and validate the results of each other and to provide maps of greater accuracy.

In a first step, information aggregation, each of management blocks 213-229 and 233-249 receives and aggregates information from each other management block that is within range of its wireless communication interface, for example, within 50 inches. For example, management block 213 may form wireless communication links with each of management blocks 215-229 and 233-249, as illustrated in FIG. 2. The information received by management block 213 includes a RSSI for each other management block. In addition, the information may include an identifier of the processing system associated with each other management block, such as a type of processing system, a unique identifier (UID), a product and serial number, or the like. The information may also include a configuration of the processing system associated with each other management block, such as a rack unit size, a location of a wireless communication antenna, or the like. In a particular embodiment, each of management blocks 213-229 and 233-249 sample the RSSI for each of the other management blocks that are with range, and averages the RSSI to increase the locational accuracy for each of the other management blocks In a next step, system grouping, each of management blocks 213-229 and 233-249 attempts to consolidate the received information to create an estimated map of the processing systems in the same server rack. In particular, any management blocks that are associated with an RSSI that is greater than for management blocks in an adjacent server rack can be estimated to be associated with processing systems that are in the same server rack. For example, from Table 1, the RSSI received from management block 233 would be expected to be −80 dBi (decibels indicated). Then, assuming that the RSSI received by management block 213 from management block 215 is −47 dBi, the RSSI received from management block 217 is −55 dBi, the RSSI received from management block 219 is −73 dBi, and the RSSI received from management block 221 is −91 dBi, then management block 213 can group processing systems 212, 214, 216, and 218 into a common group as being within server rack 210. However, management block 213 can not, without more information, know whether processing system 220 is within server rack 210 or within server rack 230, because the RSSI from management block 221 is greater than the RSSI for processing systems in server rack 230. Moreover, without more information, management block 213 can not be sure whether processing systems 214, 216, and 218 are above or below processing system 212. However, to this point, management blocks 213 and 229 can determine that respective processing systems 212 and 228 are each at either the top of server rack 210 or at the bottom of the server rack.

However, because each of management blocks 215-229 perform similar operations, all of the management blocks share their estimated processing system groupings with each other to resolve the open questions from above. For example, in a particular algorithm, management block 213 may obtain the estimated processor grouping from management block 221, and upon finding that it includes at least processing systems 214, 216, and 218, that is, processing systems that are in common with the estimated processor grouping from management block 213, the it is determined that processing system 220 is also in server rack 210. Such sharing of the estimated processing system groupings ensures that a greatest number of processing systems within a same server rack are grouped together. Moreover, by summing the differences between the RSSIs from the various management blocks, the question as to which side a particular processing system is, compared to another processing system, can also be resolved. For example, as noted above, management block 213 can not, by itself, be certain whether one or more of processing systems 214, 216, and 218 are above or below processing system 212. However, by the fact that, from the perspective of management block 215, the RSSIs from both of management blocks 213 and 217 are approximately equal to each other, it is be determined that processing system 214 is located between processing systems 212 and 216. By repeating such determinations, an ordered map of the processing systems in server racks 210 and 230 can be derived.

Thus the end processing systems, processing systems 212 and 228 in server rack 210, and processing systems 232 and 248 in server rack 230, can be identified by the system grouping step described above. However, it may still remain unclear whether processing systems 212 and 232 are located at the top of their respective server racks 210 and 230, or are located on the bottom of their server racks. In a first embodiment, the conflict is resolved by providing the alternative maps to data center management system 205, and a system administrator selects the correct map, that is to say the correct orientation of the systems in the server racks. In another embodiment, the conflict is resolved by providing management block 213 with an indication that processing system 210 is the topmost processing system of server rack 210. Note that where a server rack is tightly populated with processing systems, the determination of the map of the server rack is completed based upon the information gathering and the system grouping steps, as described above.

Figure 3:
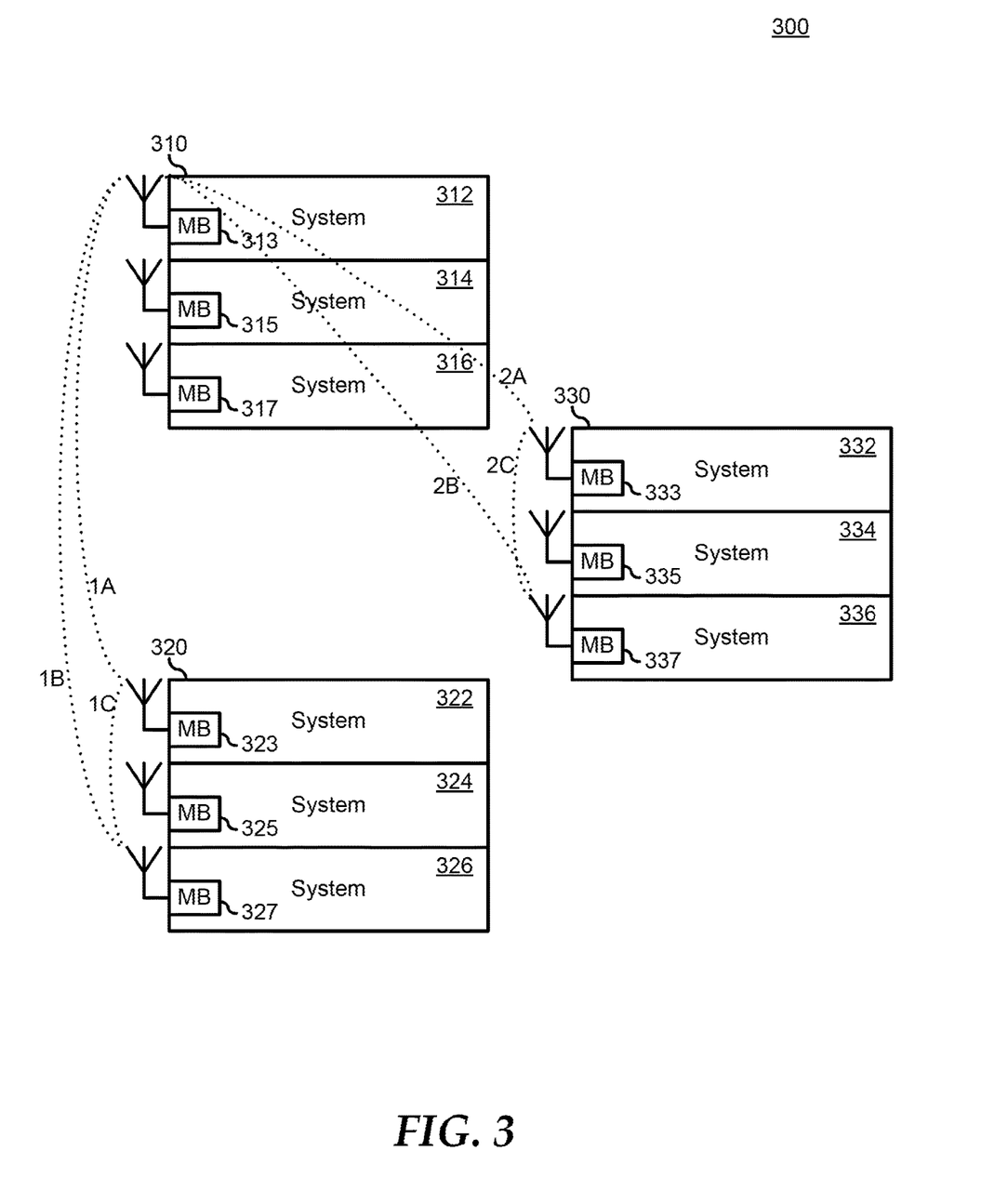
FIGS. 3 and 4 illustrate server racks within a data center according to another embodiment of the present disclosure.
Figure 4:
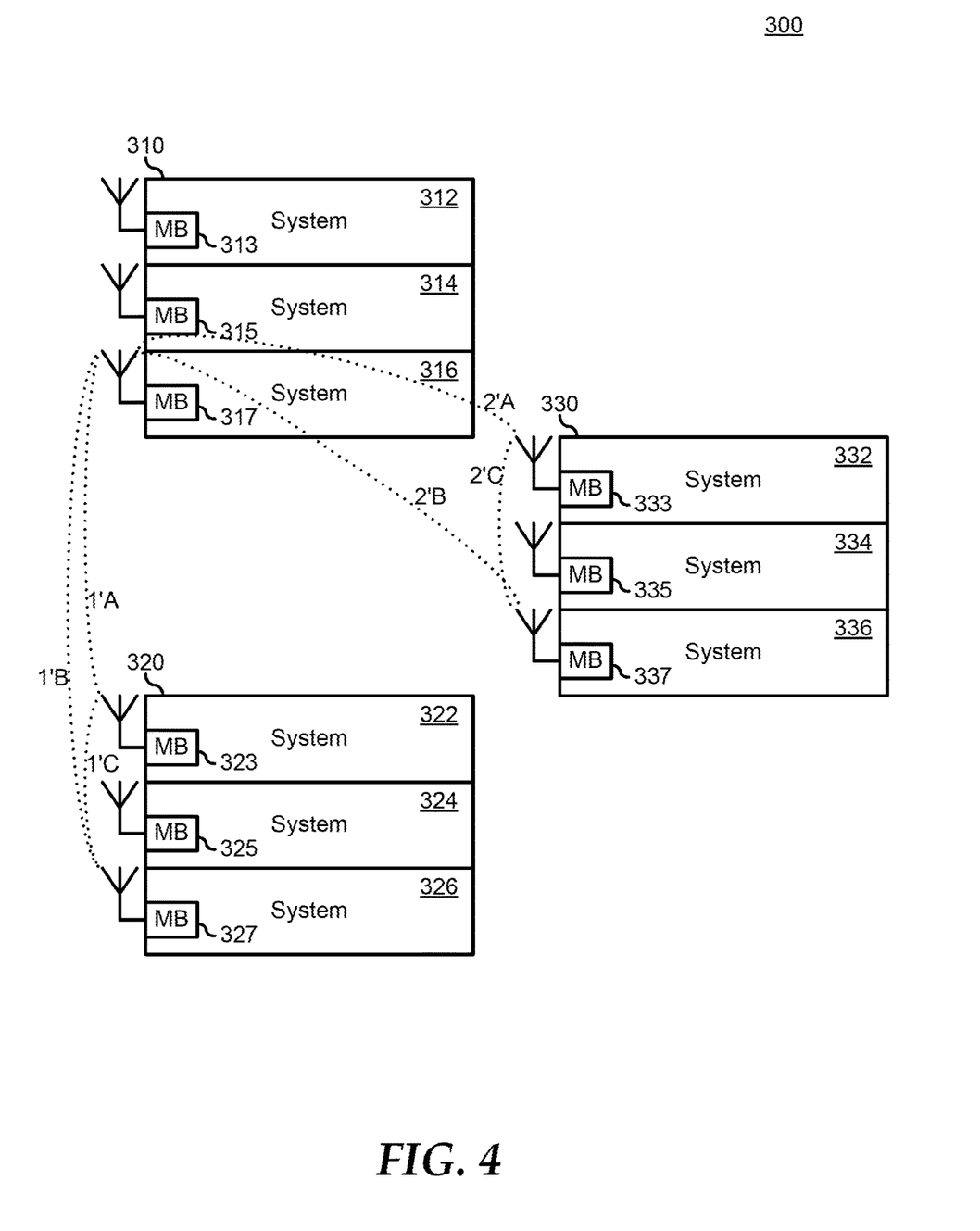

FIGS. 3 and 4 illustrate a data center 300 similar to data center 200. Data center 300 includes processing system groups 310, 320, and 330. Processing system group 310 includes processing systems 312, 314, and 316. Here, respective management blocks 313, 315, and 317 have each performed the information gathering and the system grouping steps, as describe above, and thereby determined that the processing systems are isolated to make up processing system group 310. Similarly, processing system group 320 includes processing systems 322, 324, and 326, and respective management blocks 323, 325, and 327 have each performed the information gathering and the system grouping steps, and thereby determined that the processing systems are isolated to make up processing system group 320. Finally, processing system group 330 includes processing systems 332, 334, and 336, and respective management blocks 333, 335, and 337 have each performed the information gathering and the system grouping steps, and thereby determined that the processing systems are isolated to make up processing system group 330. However, it will be understood that each processing system of processing group 310 is remote from the processing systems of either of processing groups 320 and 330, and that likewise each processing system of processing group 320 is remote from the processing systems of processing group 330. That is, the distance between any processing system of a first processing system group and any other processing system of a different processing system group is greater than the distance between server racks, such that none of the processing system groups can determine that the other processing system groups are within a same server rack.

Thus, in a final step, group merging, each of processing system groups 310, 320, and 330 attempts to merge with the other processing system groups into a number of mapped server racks. It will be noted that, between any two of processing system groups 310, 320, and 330, the processing systems of the different processing system groups will either be in a same server rack or in different server racks. Thus management blocks 313-317, 323-327, and 333-337 are each configured to determine which processing system group includes a smallest number of processing systems. Then, in order to determine which state a pair of processing system groups is in, the processing system group with the smallest number of processing systems chooses the furthest processing system from the other processing system group, designated $S_{1A}$. The processing system $S_{1A}$ then determines the RSSI value of the nearest processing system of the other processing system group, designated $S_{2N}$, the RSSI value of the farthest processing system of the other processing system group, designated $S_{2F}$ and the RSSI value between nearest and farthest processing systems of the other processing system group, designated $S_{2D}$. Here, based upon the assumption that processing systems within a same server rack are in approximately a straight line from each other, then processing system $S_{1A}$ determines a linearity of the union of the RSSI values $S_{2N}$, $S_{2F}$, and $S_{2D}$. If the linearity of the union of the values is approximately 1, then the other processing system group is determined to be in the same server rack as the processing system group with the smallest number of processing systems. In contrast, if the linearity is less then 1, then the other processing system group is determined to be in a different server rack than the processing system group with the smallest number of processing systems. Note that a similar determination can be made using the processing system of the processing system group with the smallest number of processing systems that is nearest to the other processing system group, designated $S_{1B}$, to confirm the determination made based upon the furthest processing system $S_{1A}$.

The conclusion of the processing system $S_{1A}$ can be further validated based upon a signal attenuation of a Quick Sync BLE module. For example, by attenuating the starting signals from the management blocks to less than the distance between adjacent processing systems, and sequentially reducing the attenuation until one, then two, then three, and etc. processing systems are connected, the adjacency of each processing system can be confirmed.

Further, where it cannot be conclusively determined whether a pair of processing system groups are within a same server rack, such as when both processing system groups include a small number or processing systems, the management block of the processing system S1A provides an indication to a data center management system that the status of the pair of processing system groups is unknown, and a system administrator select the correct merger of processing system groups from the set of possible processing system group maps, and the data center management system provides the correct map to the processing systems of the pair of processing system groups. Here, even though an external input may be needed to conclusively map the entire data center, the number of external inputs is greatly reduced based upon the self mapping of the processing systems in the data center, and the reduced number of uncertainties provided based upon the self mapping.

An example of the determination of the linearity between processing systems can be derived from the notion that the cosine of an angle between processing systems in a straight line will be equal to 1. Here, a distance between processing systems is determined as a function of the RSSI value as:

$$d = 10^{\frac{RSSI+A}{-10^n}} \qquad \text{Equation 1}$$

where d is the distance between the processing systems, RSSI is the received RSSI value, A is equal to 45, and n is equal to 4. Then:

$$\cos(A)=(a^2+b^2+c^2)/2ab \qquad \text{Equation 2}$$

where A is the angle formed as $S_{2F}, S_{1A}, S_{2N}$, a is the distance between $S_{1A}$ and $S_{2F}$, b is the distance between $S_{1A}$ and $S_{2N}$, and c is the distance between $S_{2F}$ and $S_{2N}$.

TABLE 1

Typical RSSI Values

| Management Block | RSSI Value |
|---|---|
| 313 to 323 | −85 dBi |
| 313 to 327 | −95 dBi |
| 323 to 327 | −80 dBi |
| 313 to 333 | −80 dBi |
| 313 to 337 | −85 dBi |
| 333 to 337 | −75 dBi |

Returning to FIG. 3, assuming that management block 313 has determined the RSSI values as provided in Table 2, above. Then, using equation 1 for evaluating the linearity between processing system groups 310 and 320, the distance 1A between management block 313 and management block 323 is 10 inches, the distance 1B between management block 313 and management block 327 is 17.7827 inches, the distance 1C between management block 323 and management block 327 is 7.9489 inches. Substituting these distances into Equation 2 yields a cosine of the angle between the processing systems of 1.0122, or approximately 1, and so the angle is 0 degrees, which indicates that processing system groups 310 and 320 are within a same server rack. Similarly, using equation 1 for evaluating the linearity between processing system groups 310 and 330, the distance 2A between management block 313 and management block 323 is 7.4989 inches, the distance 2B between management block 313 and management block 337 is 10 inches, the distance 2C between management block 333 and management block 337 is 5.6234 inches. Substituting these distances into Equation 2 yields a cosine of the angle between the processing systems of 0.8308, and so the angle is 33.8 degrees, which indicates that processing system groups 310 and 320 are within different server racks. FIG. 4 illustrates validating the conclusions of management block 313 based upon a determination of the linearity between management block 317 and processing system groups 320 and 330.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system, comprising:
a first processing device including a first Bluetooth Low Energy (BLE) wireless interface;
a second processing device including a second BLE wireless interface; and a third
processing device including a third BLE wireless interface; the first processing device configured to:
establish a first wireless link between the first and second wireless interfaces;
determine a first received signal strength indication (RSSI) for the first wireless link;
establish a second wireless link between the first and third wireless interfaces;
determine a second RSSI for the second wireless link;
receive a third RSSI for a third wireless link between the second and third processing devices; and
determine that the first, second, and third processing devices are in a first server rack based upon the first, second, and third RSSIs indicating that the first, second, and third processing devices are arranged in a line;

and the second processing device configured to:
establish the third wireless link;
determine the third RSSI for the third wireless link; and
provide the third RSSI to the first processing device;
wherein in determining that the first, second, and third processing systems are in the first server rack, the first processing device is further configured to:
determine that an angle ABC is equal to zero degrees, where A is a point associated with the second wireless link, B is a point associated with the first wireless link, and C is a point associated with the third wireless link.

2. The system of claim 1, wherein in determining that the first, second, and third processing systems are in the first server rack, the first processing device is further configured to:
estimate a first distance between the first processing device and the second processing device based upon the first RSSI;
estimate a second distance between the first processing device and the third processing device based upon the second RSSI; and
estimate a third distance between the second processing device and the third processing device based upon the third RSSI, wherein the determination that the first, second, and third processing systems are in the first server rack is further based upon the first, second, and third distances.

3. The system of claim 1, further comprising:
a fourth processing device including a fourth BLE wireless interface, wherein the fourth processing device is in the first server rack;
the fourth processing device configured to:
establish a fourth wireless link between the fourth and second wireless interfaces;
determine a fourth RSSI for the first wireless link;
establish a fifth wireless link between the fourth and third wireless interfaces;
determine a fifth RSSI for the second wireless link;
receive the third RSSI; and
confirm that the second and third processing systems are in the first server rack based upon the third, fourth, and fifth RSSIs indicating that the third, fourth, and fifth processing devices are arranged in a line.

4. The system of claim 3, wherein in confirming the determination that the second and third processing systems are in a first server rack, the fourth processing device is further configured to:
estimate a fourth distance between the fourth processing device and the second processing device based upon the fourth RSSI;
estimate a fifth distance between the fourth processing device and the third processing device based upon the fifth RSSI; and
receive the estimated third distance from the first processing device, wherein the confirmation that the second, and third processing systems are in the first server rack is further based upon the third, fourth, and fifth distances.

5. The system of claim 4, wherein in determining that the first, second, and third processing systems are in a first server rack, the first processing device is further configured to:
determine that an angle ADC is equal to zero degrees, where D is a point associated with the fourth wireless link.

6. The system of claim 1, further comprising:
a fourth processing device including a fourth BLE wireless interface; and
a fifth processing device including a fifth BLE wireless interface;
the first processing device further configured to:
establish a fourth wireless link between the first and fourth wireless interfaces;
determine a fourth RSSI for the fourth wireless link;
establish a fifth wireless link between the first and fifth wireless interfaces;
determine a fifth RSSI for the fifth wireless link;
receive a sixth RSSI for a sixth wireless link between the fourth and fifth processing systems; and
determine that the fourth and fifth processing systems are in a second server rack based upon the fourth, fifth, and sixth RSSIs indicating that the fourth, fifth, and sixth processing devices are not arranged in a line.

7. The system of claim 6, wherein in determining that the fourth and fifth processing systems are in the second server rack, the first processing device is further configured to:
estimate a fourth distance between the first processing device and the fourth processing device based upon the fourth RSSI;
estimate a fifth distance between the first processing device and the fifth processing device based upon the fifth RSSI; and
estimate a sixth distance between the fourth processing device and the fifth processing device based upon the sixth RSSI, wherein the determination that the fifth and sixth processing systems are in the second server rack is further based upon the fourth, fifth, and sixth distances.

8. The system of claim 7, wherein in determining that the fourth and fifth processing systems are in the second server rack, the first processing device is further configured to:
determine that an angle DBE is not equal to zero degrees, where D is a point associated with the fourth wireless link, and E is a point associated with the fifth wireless link.

9. The system of claim 1, wherein the first, second, and third wireless interfaces comprise Bluetooth-Low Energy interfaces.

10. A method, comprising:
establishing, between a first Bluetooth Low Energy (BLE) wireless interface of a first processing device and a second BLE wireless interface of a second processing device, a first wireless link;
determining, by the first processing device, a first received signal strength indication (RSSI) for the first wireless link;
establishing, between the first BLE wireless interface and a third BLE wireless interface of a third processing device, a third wireless link;
determining, by the first processing device, a second RSSI for the second wireless link;
establishing, between the second BLE wireless interface and the third BLE wireless interface of a fourth processing device, a third wireless link;
determining, by the second processing device, a third RSSI for the third wireless link;
providing, by the second processing device, the third RSSI to the first processing device; and
determining, by the first processing device, that the first, second, and third processing systems are in a first server rack based upon the first, second, and third received RSSIs indicating that the first, second, and third processing devices are arranged in a line;

wherein in determining that the first, second, and third processing systems are in the first server rack, the method is further comprises:

determine that an angle ABC is equal to zero degrees, where A is a point associated with the second wireless link, B is a point associated with the first wireless link, and C is a point associated with the third wireless link.

11. The method of claim 10, wherein in determining that the first, second, and third processing systems are in the first server rack, the method further comprises:

estimating, by the first processing device, a first distance between the first processing device and the second processing device based upon the first RSSI;

estimating, by the first processing device, a second distance between the first processing device and the third processing device based upon the second RSSI; and estimating, by the first processing device, a third distance between the second processing device and the third processing device based upon the third RSSI, wherein the determination that the first, second, and third processing systems are in the first server rack is further based upon the first, second, and third distances.

12. The method of claim 10, further comprising:

establishing, between a fourth wireless interface of a fourth processing device and the second wireless interface, a fourth wireless link, wherein the fourth processing device is in the first server rack;

determining, by the fourth processing device, a fourth RSSI for the fourth wireless link;

establishing, between the fourth wireless interface and the third wireless interface, a fifth wireless link;

determining, by the fourth processing device, a fifth RSSI for the fifth wireless link;

receiving, by the fourth processing device, the third RSSI; and confirming, by the fourth processing device, that the second and third processing systems are in the first server rack based upon the third, fourth, and fifth RSSIs indicating that the third, fourth, and fifth processing devices are arranged in a line.

13. The method of claim 12, wherein in confirming the determination that the second and third processing systems are in a first server rack, the method further comprises:

estimating, by the fourth processing device, a fourth distance between the fourth processing device and the second processing device based upon the fourth RSSI;

estimating, by the fourth processing device, a fifth distance between the fourth processing device and the third processing device based upon the fifth RSSI; and receiving, by the fourth processing device, the estimated third distance from the first processing device, wherein the confirmation that the second, and third processing systems are in the first server rack is further based upon the third, fourth, and fifth distances.

14. The method of claim 13, wherein in determining that the first, second, and third processing systems are in a first server rack, the method further comprises:

determining, by the fourth processing device, that an angle ADC is equal to zero degrees, where D is a point associated with the fourth wireless link.

15. The method of claim 10, further comprising:

establishing, between the first wireless interface and a fourth wireless interface of a fourth processing device, a fourth wireless link;

determining, by the first processing device, a fourth RSSI for the fourth wireless link;

establishing, between the first wireless interface and a fifth wireless interface of a fifth processing device, a fifth wireless link;

determining, by the first processing device, a fifth RSSI for the fifth wireless link;

receiving, by the first processing device, a sixth RSSI for a sixth wireless link between the fourth and fifth processing systems; and determining, by the first processing device, that the fourth and fifth processing systems are in a second server rack based upon the fourth, fifth, and sixth RSSIs indicating that the fourth, fifth, and sixth processing devices are not arranged in a line.

16. The method of claim 15, wherein in determining that the fourth and fifth processing systems are in the second server rack, the method further comprises:

estimating, by the first processing device, a fourth distance between the first processing device and the fourth processing device based upon the fourth RSSI;

estimating, by the first processing device, a fifth distance between the first processing device and the fifth processing device based upon the fifth RSSI; and estimating, by the first processing device, a sixth distance between the fourth processing device and the fifth processing device based upon the sixth RSSI, wherein the determination that the fifth and sixth processing systems are in the second server rack is further based upon the fourth, fifth, and sixth distances.

17. The method of claim 16, wherein in determining that the fourth and fifth processing systems are in the second server rack, the method further comprises:

determining, by the first processing device, that an angle DBE is not equal to zero degrees, where D is a point associated with the fourth wireless link, and E is a point associated with the fifth wireless link.

* * * * *

UNITED STATES PATENT AND TRADEMARK OFFICE
CERTIFICATE OF CORRECTION

PATENT NO. : 10,638,259 B2
APPLICATION NO. : 15/672998
DATED : April 28, 2020
INVENTOR(S) : Jeffrey M. Lairsey et al.

Page 1 of 1

It is certified that error appears in the above-identified patent and that said Letters Patent is hereby corrected as shown below:

Column 14, Line 67 to Column 15, Line 1 Claim 1:
Please change "third received RSSIs" to --third RSSIs--

Signed and Sealed this
Twenty-third Day of June, 2020

Andrei Iancu
*Director of the United States Patent and Trademark Office*